United States Patent [19]
Ishizaki et al.

[11] Patent Number: 5,884,140
[45] Date of Patent: *Mar. 16, 1999

[54] INFORMATION DISTRIBUTING SYSTEM WITH SUB-STATIONS TRANSMITTING BROADCAST INFORMATION BY WIRELESS AND TERMINALS RECEIVING THE INFORMATION

[75] Inventors: Masayuki Ishizaki; Kazuo Satoh; Yoshimasa Kadooka; Mariko Hayakawa, all of Kawasaki, Japan

[73] Assignee: Fujitsu Limited, Kanagawa, Japan

[*] Notice: This patent issued on a continued prosecution application filed under 37 CFR 1.53(d), and is subject to the twenty year patent term provisions of 35 U.S.C. 154(a)(2).

[21] Appl. No.: 512,263

[22] Filed: Aug. 7, 1995

Related U.S. Application Data

[63] Continuation of Ser. No. 963,570, Oct. 19, 1992, abandoned.

[30] Foreign Application Priority Data

Oct. 18, 1991 [JP] Japan .................................. 3-270639
Oct. 30, 1991 [JP] Japan .................................. 3-284416

[51] Int. Cl.$^6$ ...................................................... H04H 9/00
[52] U.S. Cl. .......................... 455/2; 455/12.1; 455/406; 455/524
[58] Field of Search ................................. 455/2, 3.1, 3.2, 455/12.1, 54.2, 56.1, 66, 89, 351, 11.1, 45, 406, 407, 412, 413

[56] References Cited

U.S. PATENT DOCUMENTS

| | | |
|---|---|---|
| 4,473,824 | 9/1984 | Claytor . |
| 4,536,791 | 8/1985 | Campbell et al. ........................ 348/1 |
| 4,665,519 | 5/1987 | Kirchner et al. . |
| 4,694,490 | 9/1987 | Harvey et al. ............................. 380/20 |
| 4,763,317 | 8/1988 | Lehman et al. ............................ 370/60 |
| 4,856,088 | 8/1989 | Oliwa ....................................... 455/351 |
| 4,860,352 | 8/1989 | Laurance et al. ....................... 455/12.1 |
| 5,177,604 | 1/1993 | Martinez ................................... 358/86 |
| 5,247,575 | 9/1993 | Sprague et al. ............................. 455/2 |
| 5,303,393 | 4/1994 | Noreen et al. ........................... 455/54.2 |

FOREIGN PATENT DOCUMENTS

| | | |
|---|---|---|
| 2672756 | 8/1992 | France . |
| 2715865 | 10/1977 | Germany . |
| 3706240 | 9/1988 | Germany . |
| 60-39985 | 3/1985 | Japan . |
| A60-140935 | 7/1985 | Japan . |
| A60-220631 | 11/1985 | Japan . |
| 62-23630 | 1/1987 | Japan . |
| A62-77782 | 4/1987 | Japan . |
| A62-231530 | 10/1987 | Japan . |
| 648492 | 1/1989 | Japan . |

*Primary Examiner*—Nguyen Vo
*Assistant Examiner*—Lee Nguyen
*Attorney, Agent, or Firm*—Helfgott & Karas, P.C.

[57] ABSTRACT

An information distribution system for distributing information, containing: a first station for transmitting a first signal carrying information to at least one second station; the at least one second station for receiving the first signal, and transmitting a second signal carrying the information to an area around a place at which the second station is located; and at least one terminal for receiving the second signal, and displaying the information. The second signal is a wireless signal. The at least one terminal contains, a wireless receiver unit for receiving the second signal, a storage unit for storing the information, a display unit for displaying the information stored in the storage unit, a display control unit for controlling the storage unit and the display unit in accordance with a display command, and a unit for inputting the display command for commanding the display control unit how the information stored in the storage unit is to be displayed.

10 Claims, 24 Drawing Sheets

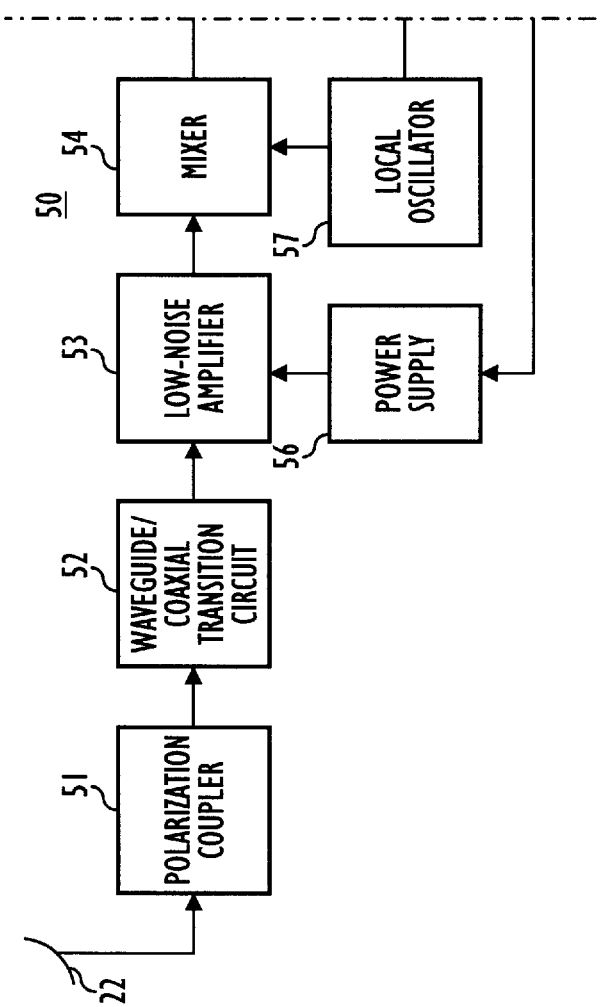

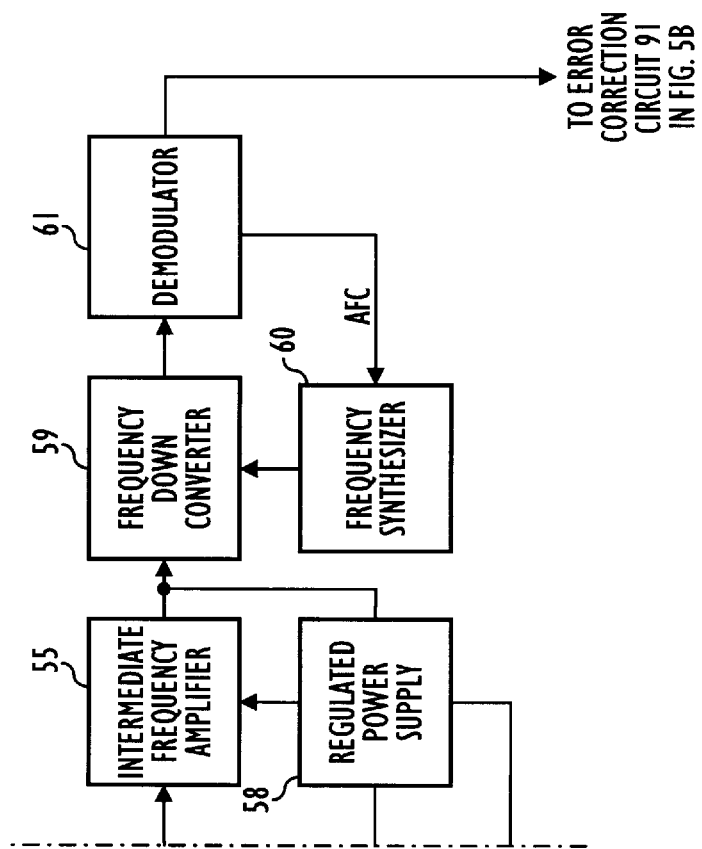
FIG. 5A-b

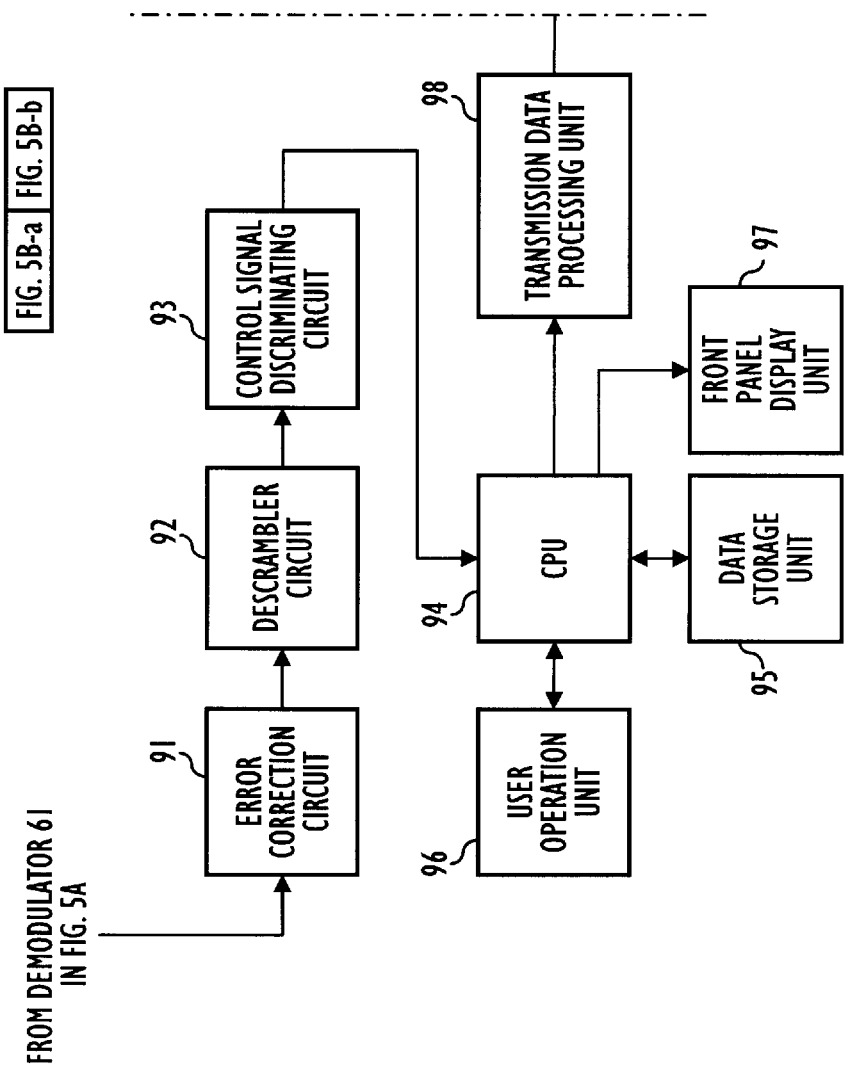

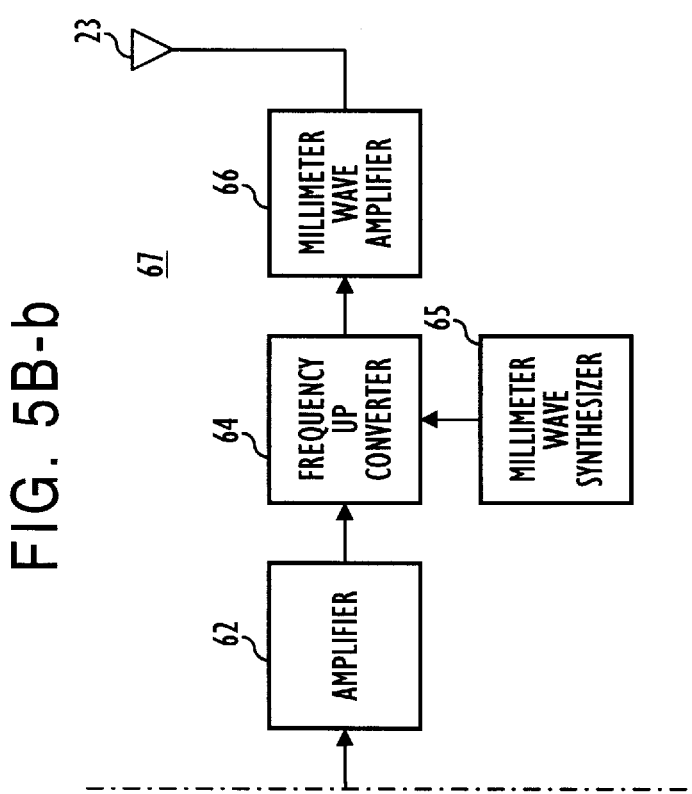
FIG. 5B-b

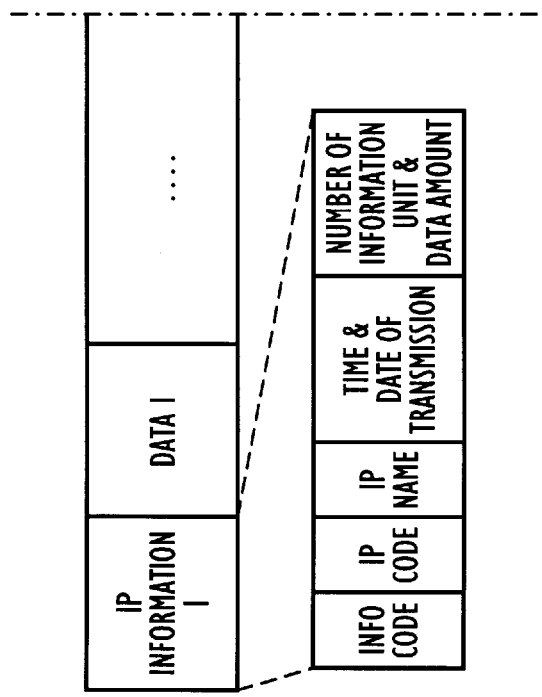

FIG. 7

| INFO CODE | IP CODE | DATA CODE | WRITTEN TIME & DATE | TITLE | AUTHOR |
|---|---|---|---|---|---|
| 01 | 001 | 110020 110021 | 91.05.03 91.05.03 | XXXXXX X X X X X YYYY YYYYYYYYY YYYY ... | — |
| 02 | 121 | 213010 213011 | 91.04.29 91.04.30 | ZZZZZZZZZZZ ZZZZZZZ ZZZ WWWWWW WWWWWWWWWW WWWWW ... | |

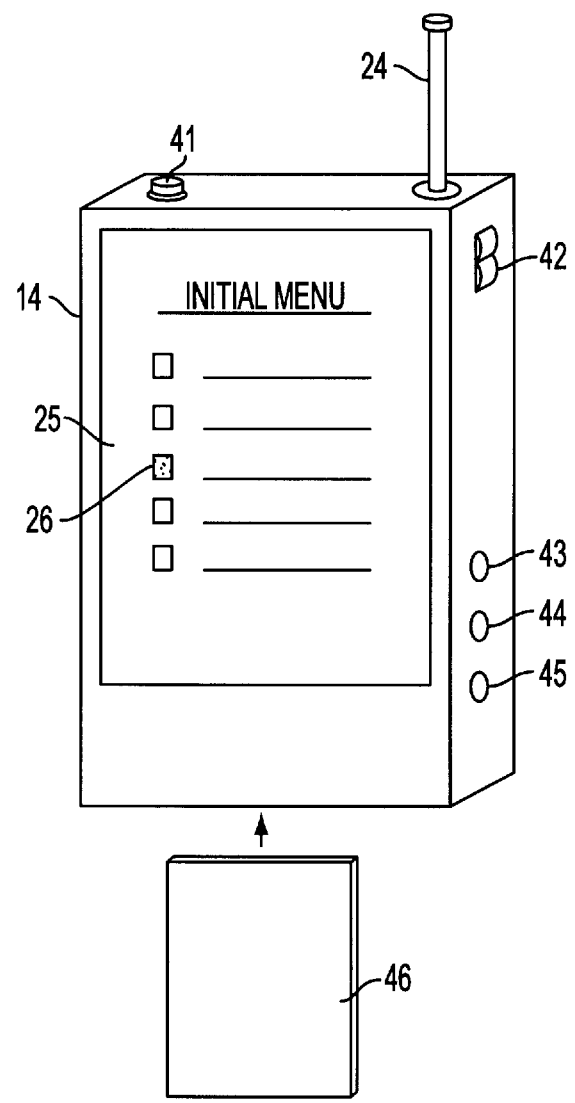

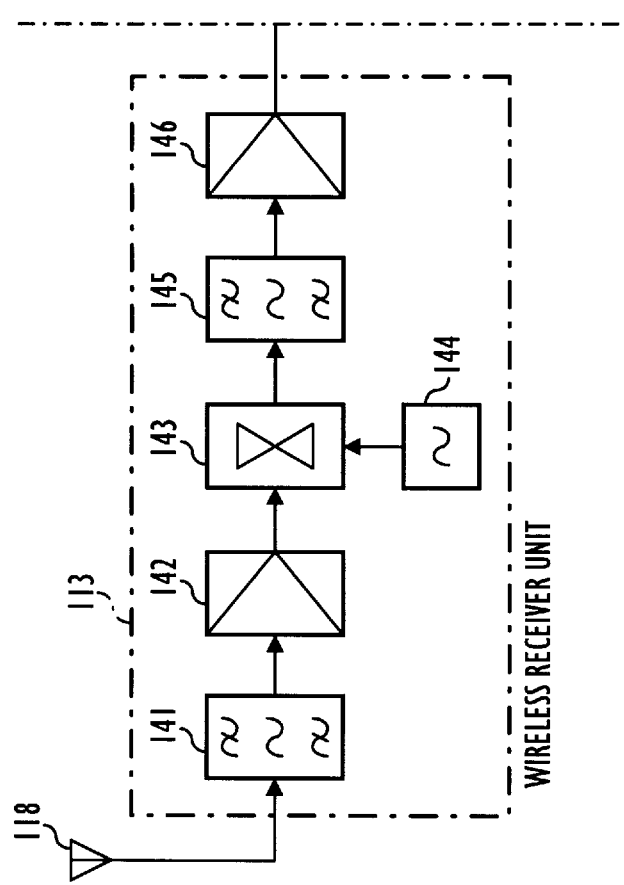

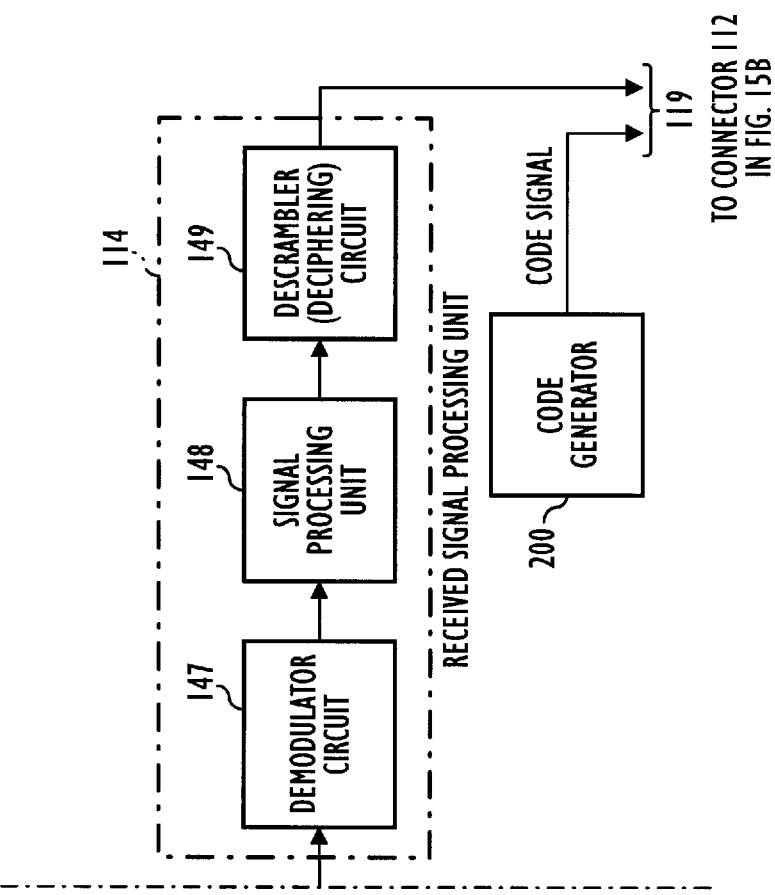
FIG. 15A-b

INFORMATION DISTRIBUTING SYSTEM WITH SUB-STATIONS TRANSMITTING BROADCAST INFORMATION BY WIRELESS AND TERMINALS RECEIVING THE INFORMATION

CROSS-REFERENCE TO RELATED APPLICATION

This is a continuation of application Ser. No. 07/963,570, filed Oct. 19, 1922 now abandoned. This application is related to a copending application, Ser. No. 08/253,235, filed Jun. 2, 1994, which is a continuation of Ser. No. 07/954,651 filed on Sep. 30, 1992, now abandoned, assigned to the same assignee as the subject application, and Masayuki Ishizaki, Kazuo Sato, Yoshimasa Kadooka, and Mariko Hayakawa are inventors of both the copending application and the subject application.

BACKGROUND OF THE INVENTION (1) Field of the Invention

The present invention relates to an information distribution system for distributing information such as news in various fields (genres), stock prices, exchange rates, and the like.

(2) Description of the Related Art

Conventionally, there are various means for distributing information to persons: for example, information printed on paper such as a newspaper, a magazine, books, and the like; broadcasted information, for example, by a television and a radio network; and information supply service through a telephone network such as a database service. The information in a newspaper or a magazine is distributed to people after being printed on paper. However, a large amount of paper is used for printing the information, resulting in consumption of a large amount of wood resources on the earth, and a heavy load on traffic and transportation systems. In addition, a delay is inevitable due to the operations of printing, transporting, and the like. Further, people must go to newspaper stands or book shops to obtain the information in a newspaper, a magazine. As an advantage, the information in a newspaper or a magazine can be read many times and at any time. On the other hand, broadcasted information can be heard and/or seen at any place only as long as a receiver is available. However, the broadcasted information is transitory, and therefore, must be recorded by a tape recorder, a video tape recorder, or the like, for hearing and/or seeing repeatedly after the time the information is broadcasted. Further, to obtain information from the information supply service through a telephone network such as a database service, a person must have an expensive terminal, connect the terminal to a telephone network, and access a supplier of the information. Thus, bothersome operations are required for a person to obtain the information from the supplier of the information through the telephone network.

SUMMARY OF THE INVENTION

An object of the present invention is to provide an information distribution system and an information displaying apparatus whereby a person who requests information can easily obtain the information and can easily read or see the information repeatedly at any time, without a bothersome operation and large-size hardware.

According to the first aspect of the present invention, there is provided an information distribution system for distributing information, containing: a first transmission station for transmitting a first signal carrying information to at least one second transmission station; the at least one second transmission station receiving the first signal, and broadcasting a second signal carrying the information to an area around a place at which the second transmission station is located; and at least one piece of terminal equipment for receiving the second signal, and displaying the information carried by the second signal. The second signal is a wireless signal. The at least one piece of terminal equipment contains a wireless receiver unit for receiving the second signal, a storage unit for storing the information carried by the second signal received by the wireless receiver unit, a display unit for displaying the information stored in the storage unit, a display control unit for controlling the storage unit and the display unit in accordance with a display command, and a display command information input unit for inputting the display command for commanding the display control unit how the information stored in the storage unit is to be displayed by the display control unit.

According to the second aspect of the present invention, there is provided an information displaying apparatus containing: a signal input terminal for inputting a signal carrying information, a storage unit for storing the information carried by the signal input through the signal input terminal, a transfer control unit for receiving the signal through the signal input terminal, and storing the information in the storage unit, a display unit for displaying the information stored in the storage unit, a display control unit for controlling the storage unit and the display unit in accordance with a display command, and a display command information input unit for inputting the display command for commanding the display control unit how the information stored in the storage unit is to be displayed by the display control unit.

According to the third aspect of the present invention, there is provided a wireless receiver apparatus containing: a signal output terminal for outputting a signal carrying information, and a wireless receiver unit for receiving a wireless signal carrying information, and outputting the received information through said first signal output terminal.

BRIEF DESCRIPTION OF THE DRAWINGS

In the drawings:

FIGS. 5A (comprised of FIG. 5A-a and FIG. 5A-b) and 5B (comprised of FIG. 5B-a and FIG. 5B-b) indicate a block diagram of a detail of the internal construction of the wireless substation which also functions as an automatic information vending machine;

FIGS. 6A and 6B indicate an example format of data transmitted from a communications satellite and received by the wireless substation in the embodiment of the present invention;

FIG. 7 indicates an example content of an information management table provided in the information displaying apparatus in the embodiment of the present invention;

FIG. 8 illustrates a piece of terminal equipment and a prepaid card to be inserted in the terminal equipment as an embodiment;

FIG. 15A (comprised of FIG. 15A-a and FIG. 15A-b) is a block diagram of a detail of the internal construction of the detachable wireless receiver in the embodiment of the present invention;

Figure 1:
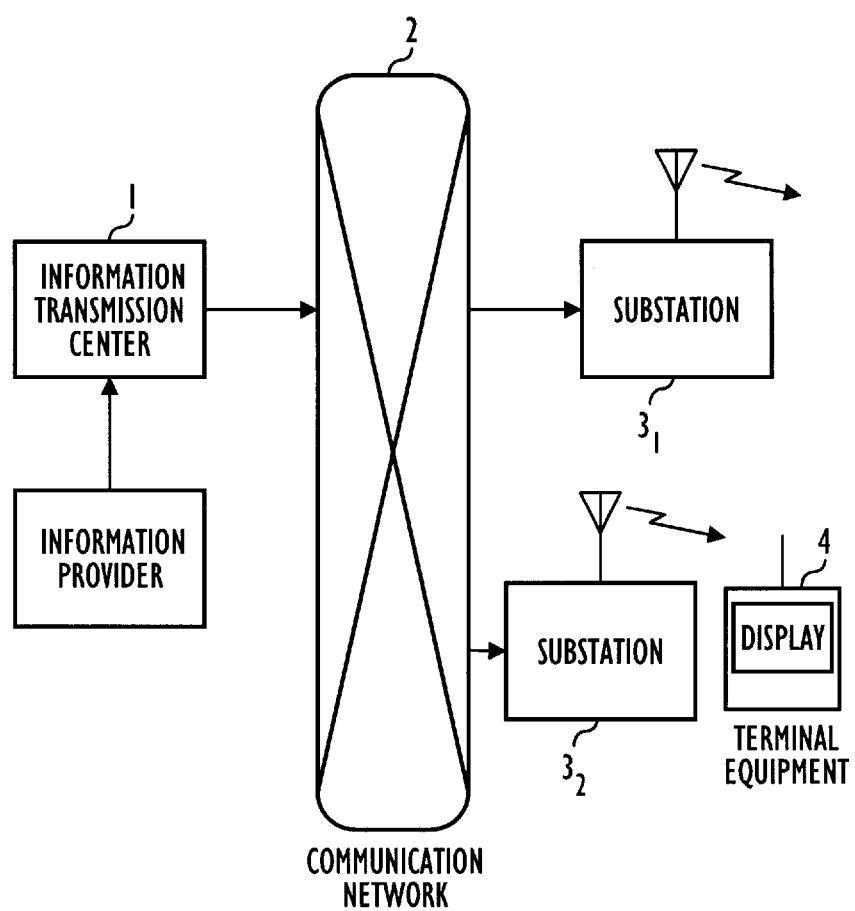
FIG. 1 illustrates a basic construction of an information distribution system according to the present invention.
Figure 2:
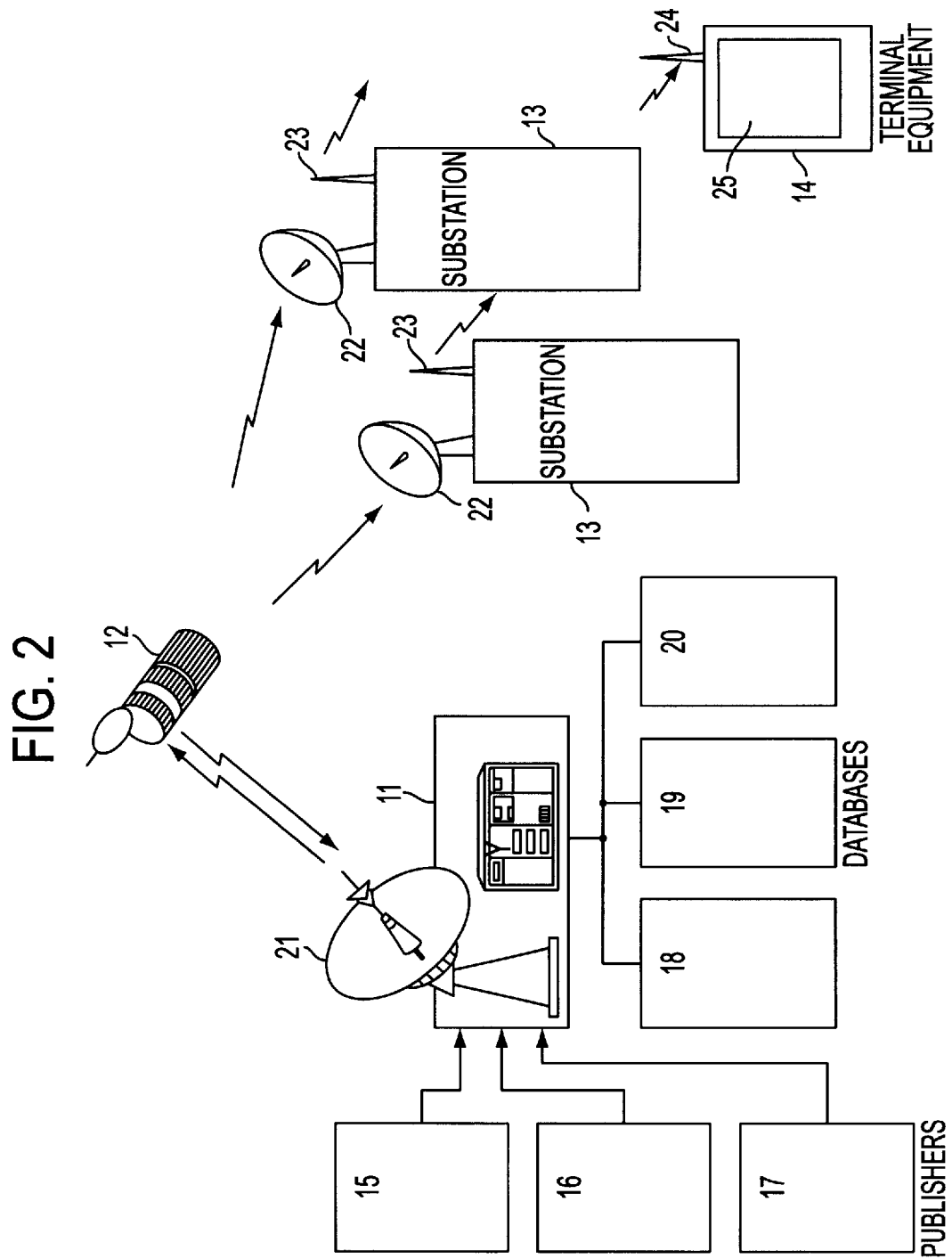
FIG. 2 illustrates a portion of an example configuration of the information distribution system according to the present invention.

DESCRIPTION OF THE PREFERRED EMBODIMENTS BASIC CONSTRUCTION OF INFORMATION DISTRIBUTING SYSTEM (FIGS. 1 and 2)

FIG. 1 illustrates a basic construction of an information distribution system according to the present invention. In FIG. 1, reference numeral 1 denotes an information transmission center (station), 2 denotes a communication network, $3_1$ and $3_2$ each denote a substation, and 4 denotes a piece of terminal equipment. Information to be commercially delivered to customers (readers), such as contents of magazines, newspapers, and the like, are transmitted from the information transmission center 1 to the substations $3_1$ and $3_2$ through the communication network 2. The communication network 2 may be a wire communication network on the ground, or a wireless communication network using one or more communications satellites. The substations $3_1$ and $3_2$ receive the information from the information transmission center 1 through the communication network 2, and transmit the information by wireless to the terminal equipment 4. The substations $3_1$ and $3_2$ may be placed dispersively at various places. The terminal equipment 4 contains a wireless receiver unit for receiving the information transmitted from the substations $3_1$ and $3_2$ by wireless, a storage for storing the received information, and a display unit for displaying the stored information. Preferably, the terminal equipment 4 may be portable. When a person who carries the terminal equipment 4 is within a service area around one of the substations $3_1$ and $3_2$, the information transmitted from the substation can be received by the terminal equipment 4, be stored therein, and be displayed on the display unit in the terminal equipment 4. Thus, persons carrying the terminal equipment 4 can obtain real-time information. In addition, due to the provision of the storage unit in the terminal equipment 4, the person can repeatedly read or see the information on the display unit of the terminal equipment 4 at any time.

Preferably, the information may be transmitted from each substation by millimeter waves. By using the millimeter waves, a large amount of information can be transmitted with a high bit rate since a large band width is available in the millimeter wave band. Therefore, a large amount of data can be transmitted from one of the substations $3_1$ and $3_2$ to the terminal equipment 4 in a short time while the person carrying the terminal equipment 4 passes through the area covered by the millimeter waves transmitted from the substation. In addition, since the millimeter waves attenuate relatively rapidly, an interference between millimeter waves transmitted from more than one substation can be prevented. Further, the size of circuitry can be made small due to the high frequency of the millimeter waves.

The wireless signal carrying the information transmitted from the substation may be scrambled or ciphered, and correspondingly, the terminal equipment 4 may contain a descrambler circuit or deciphering circuit, so that only the person who has the terminal equipment provided in the information distribution system can receive the information.

Further, the terminal equipment 4 can contain a unit for receiving a prepaid card, and a unit for reading code recorded on the prepaid card. The code recorded on the prepaid card can indicate whether or not the person who has the prepaid card is allowed to receive the information transmitted in the information distribution system, using the terminal equipment, and further the code on the prepaid card can indicate a type of the contract (or a type of the prepaid card). Dependent on the type, it is determined what kind(s) of information the person who has the prepaid card is allowed to receive.

The information transmitted to the terminal equipment 4 may be image information, character information, or sound information. When sound information is transmitted, the terminal equipment 4 should contain a speaker or an earphone and a sound signal regenerating unit for regenerating a sound signal from a wireless signal carrying the sound information, to drive the speaker or the earphone.

FIG. 2 illustrates a portion of an example configuration of the information distribution system according to the present invention. In FIG. 2, reference numeral 11 denotes an information transmission center, 12 denotes a communications satellite, 13 denotes a wireless substation, 14 denotes a piece of portable terminal equipment, 15, 16, and 17 each denote an information supplier such as a newspaper publishing company, a magazine publishing company, and the like, 18, 19, and 20 each denote a database provided in the information transmission center 11, 21 denotes a transmission antenna in the information transmission center, 22 denotes a receiver antenna in the wireless substation, 23 denotes a transmission antenna in the wireless substation, 24 denotes a receiver antenna in the terminal equipment 24, and 25 denotes a display on the terminal equipment 14.

WIRELESS SUBSTATION (FIG. 3, 4A, 4B, 5A, 5B, 6A, and 6B)

Figure 3:
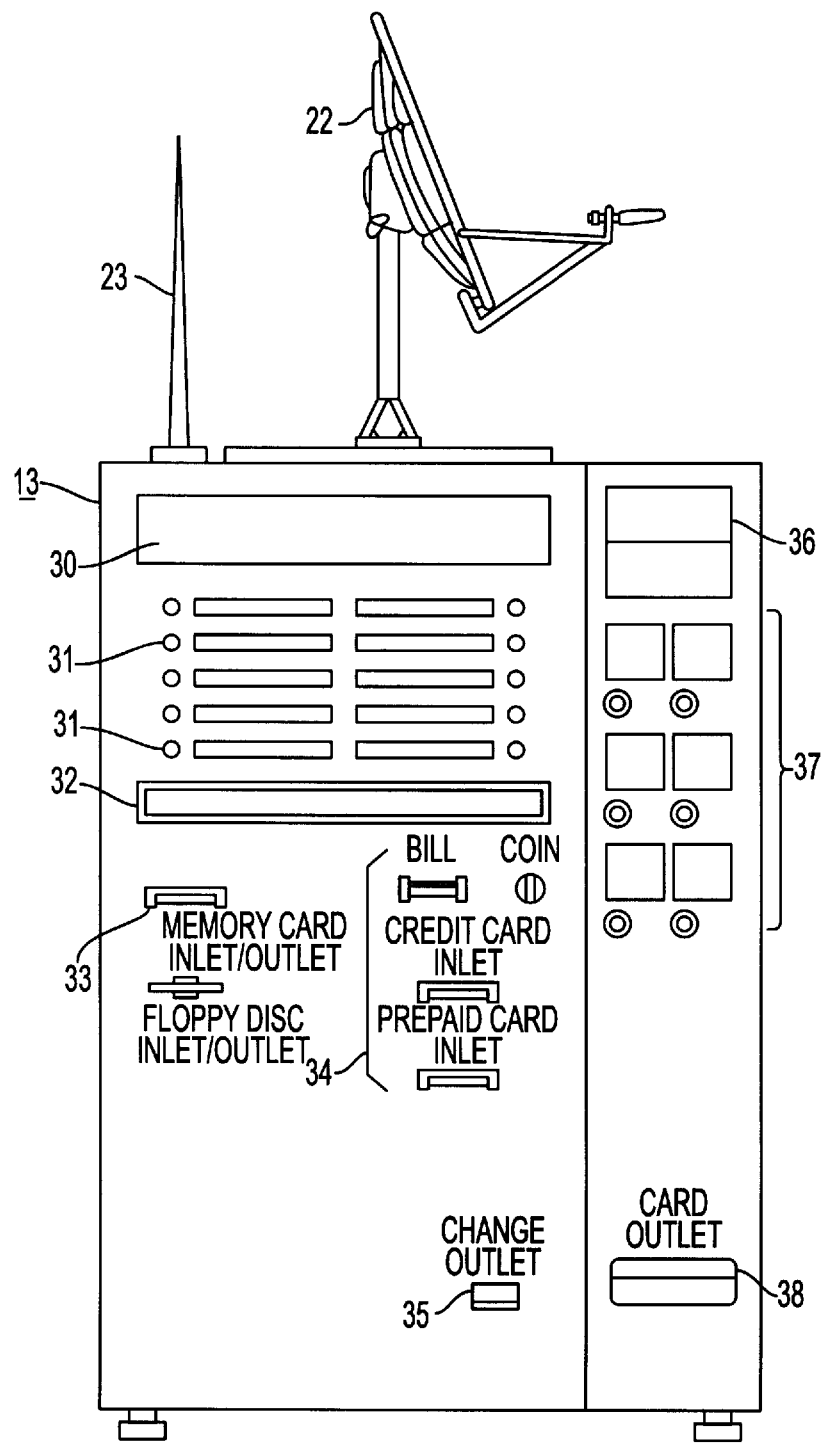
FIG. 3 is a front view of an apparatus for the wireless substation used in an embodiment of the present invention.

FIG. 3 is a front view of an example apparatus of the wireless substation as the embodiment of the present invention. In FIG. 3, reference numeral 22 denotes the receiver antenna in the wireless substation, 23 denotes the transmission antenna in the wireless substation. Although a parabola antenna is indicated for the receiver antenna 22 in FIG. 3, the receiver antenna 22 may be a planar antenna, or any other antenna. In addition, although the receiver antenna 22 and the transmission antenna 23 are directly mounted on the main frame of the apparatus for the wireless substation, the receiver antenna 22 and the transmission antenna 23 can be separated from the main frame. For example, the parabolic antenna can be mounted on a roof separated from the main frame, and each of the receiver antenna 22 and the transmission antenna 23 and the main frame can be connected with a cable. The transmission antenna 23 indicated in FIG. 3 is a non-directional type. However, a directional type of transmission antenna may be used so that a required service area is covered under the directions of millimeter waves transmitted from the directional transmission antenna.

As a minimal construction, the wireless substation should have a function to receive a signal transmitted from the communications satellite, and a function to transmit a signal to the terminal equipment. In addition, the wireless substation indicated in FIG. 3 also has a function of an automatic vending machine. For example, customers can buy a prepaid card from the automatic vending machine. The prepaid card is to be inserted into the terminal equipment as explained later. In FIG. 3, reference numeral 30 denotes a display for indicating what kinds of prepaid cards are vended in the automatic vending machine (that is, what kind of information can be received using the prepaid card vended by the automatic vending machine), for example, indicating whether the automatic information vending machine is vending newspaper or a magazine; 31 denotes card type selecting buttons; 32 denotes a display for indicating a message from the automatic vending machine to a customer, for example, indicating a step of a procedure, and a charged amount for information requested by the customer; 33 denotes inlets/outlets for a memory card and a floppy disk; 35 denotes inlets/outlets for cash (bill and coin), a prepaid card, and a credit card, for paying a charge for the prepaid card; 36 denotes an outlet for change; and 39 denotes an outlet for the prepaid card. The card type selecting buttons 31 are provided for a plurality of kinds of information, and thus, the customer can select any type of prepaid card. As mentioned above, a code indicating the type is recorded on each prepaid card, and dependent on the type, it is determined that what kind(s) of information can be received using the prepaid card. For example, one of the plurality of types allows reception of information on stock prices, and another type allows reception of information in newspaper, and the like.

The apparatus for the wireless substation can have a function of an automatic information vending machine for vending information by writing the information on a storage medium which is inserted into an inlet for the storage medium provided in the front panel. The construction and the operations of the automatic information vending machine are explained in detail in the copending application filed on Sep. 30, 1992, referred to in the beginning of this specification. When the wireless substation of FIG. 3 has a function of the automatic information vending machine, the elements indicated on the front panel function as follows, instead of the above functions. Reference numeral 30 denotes a display for indicating what kind of information can be bought from the automatic information vending machine, for example, indicating whether or not the automatic information vending machine is vending a newspaper or a magazine; 31 denotes title selecting buttons; 32 denotes a display for indicating a message from the automatic information vending machine to a customer, for example, indicating a step of a procedure, and a charged amount for information requested by the customer; 33 denotes inlets/outlets for a memory card and a floppy disk; 34 denotes an inlet of the storage medium such as a memory card and a floppy disk; 35 denotes inlets/outlets for cash (bill and coin), a prepaid card, and a credit card; 36 denotes an outlet for an exchange; 37 denotes an indication of whether a new piece of storage medium is a memory card or a floppy disk; 38 denotes buttons for selecting a new piece of storage medium; and 39 denotes an outlet for the new piece of storage medium. Customers who wish to buy (information in) a magazine or newspaper can receive the information in the magazine or newspaper by operating the automatic information vending machine and paying a necessary charge for the information, as explained later. The information is output from the automatic information vending machine to the customer by writing the information in a portable piece of storage medium, such as a memory card or a floppy disk. The piece of storage medium may be brought to the automatic information vending machine by the customer, and be inserted into an inlet for the piece of storage medium, provided on the automatic information vending machine, to have the information written in the piece of storage medium. Alternatively, the automatic information vending machine may stock a number of pieces of storage medium therein so that the automatic information vending machine can write the information in one of the stocked pieces of storage medium and then output the piece of storage medium to the customer who requests the information. After receiving the piece of storage medium in which the information has written, the customer can read the information by inserting the piece of storage medium into a terminal apparatus by which the content of the piece of storage medium can be read. The terminal apparatus is, for example, a personal computer with a floppy disk drive, or a memory card reader.

Further, the apparatus for the wireless substation may contain a storage for storing the information received from the communications satellite, and the transmission of the information from the wireless substation can be carried out only when an instruction to transmit the information is input into the apparatus for the wireless substation. Although not shown, the instruction as above can be given to the apparatus by operating a manual switch (not shown). Or payment of an amount of a charge for transmission of information by money, a prepaid card, or a credit card, may be regarded as the instruction when the apparatus is preset so that only a predetermined kind of information can be transmitted from the apparatus. The payment may be carried out using a construction similar to the construction as indicated in FIG. 3. When a plurality of options are provided for titles or kinds of information, the title selecting buttons 31 may be used for selecting a title or kind of information which a customer wishes to buy or wishes to be transmitted. When information on the title or kind is input into the apparatus, a central processing unit (CPU, explained later) in the apparatus may make a display unit display a message "please pay $ . . . ", to prompt the customer to pay a charge for the title or kind of information. After the payment of the charge is confirmed, the CPU starts the transmission of the title or kind of information.

INTERNAL CONSTRUCTION OF WIRELESS SUBSTATION
(FIGS. 4A, 4B, 5A, and 5B)

Figure 4A:
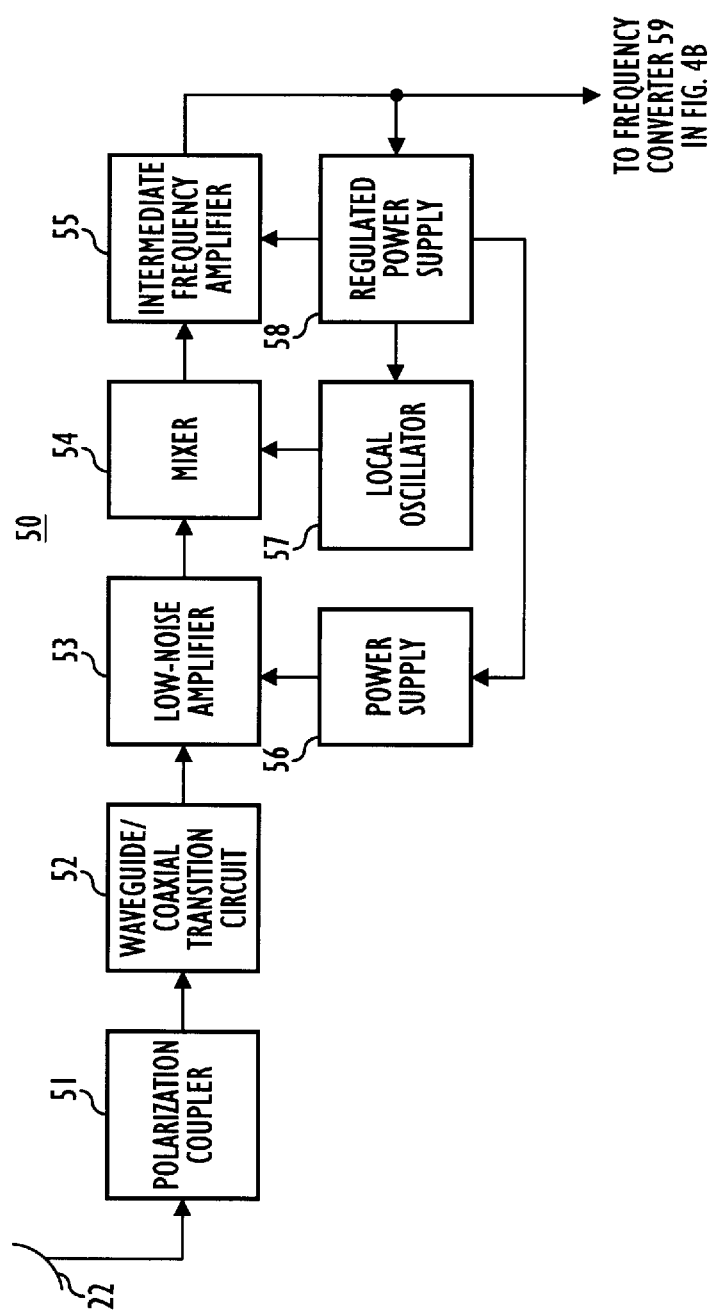
FIGS. 4A and 4B indicate a block diagram of a detail of the internal construction of the wireless substation, for receiving a signal transmitted by microwave from a communications satellite and carrying information, and for transmitting a signal carrying the information by millimeter wave.
Figure 4B:
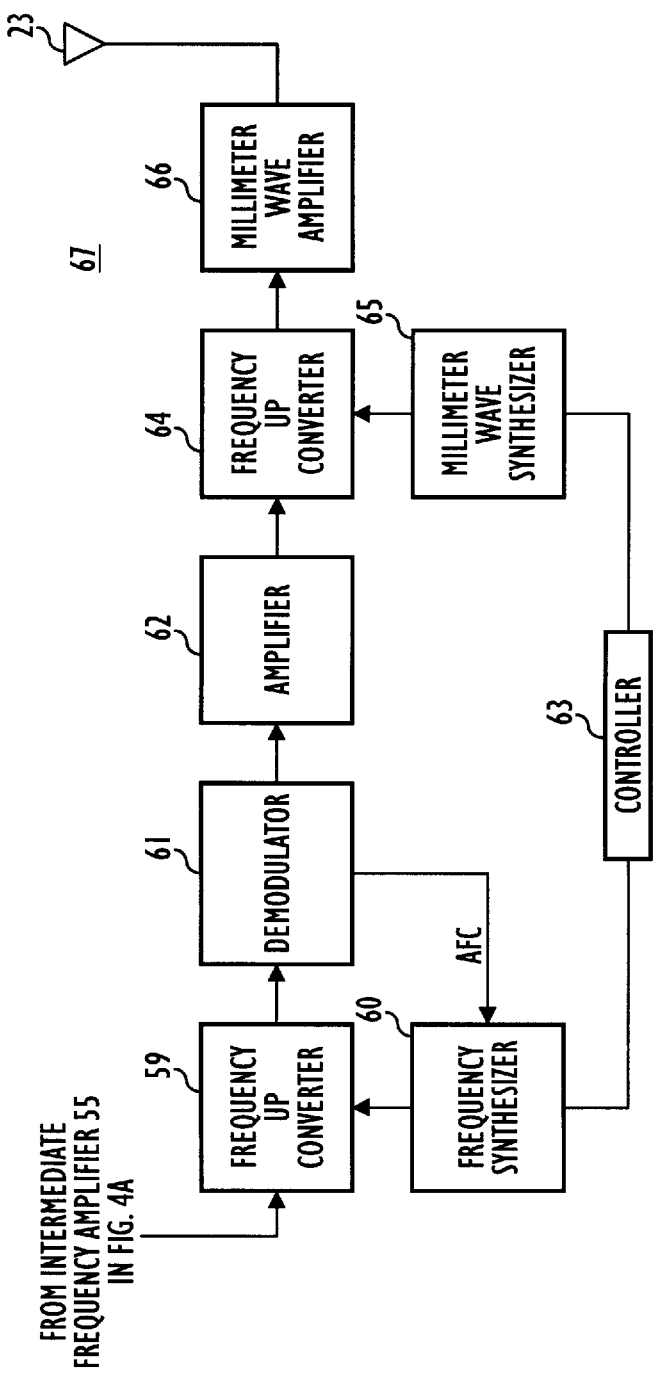

FIGS. 4A and 4B indicate a block diagram of a detail of the internal construction of the apparatus for the wireless substation, for receiving a signal carrying information transmitted by microwave from a communications satellite, and for transmitting a signal carrying the information by millimeter wave.

In FIGS. 4A and 4B, reference numeral 22 denotes the above-mentioned receiver antenna, 23 denotes the above-mentioned transmission antenna, 50 denotes a satellite receiver, 51 denotes a polarization coupler, 52 denotes a waveguide/coaxial transition circuit, 53 denotes a low-noise amplifier, 54 denotes a mixer, 55 denotes an intermediate frequency amplifier, 56 denotes a regulated power supply circuit, 57 denotes a local frequency oscillator, 58 denotes a power supply circuit, 59 denotes a frequency down converter, 60 denotes a frequency synthesizer, 61 denotes a demodulator, 62 denotes an amplifier, 63 denotes a controller, 64 denotes a frequency up converter, 65 denotes a millimeter wave synthesizer, 66 denotes a millimeter wave amplifier, and 67 denotes a millimeter wave transmitter.

A signal carrying information and transmitted by microwave from a communications satellite, is received by the receiver antenna 22, and then polarized components of the received signal are separated by the polarization coupler 51. Next, the signal is converted from a waveguide mode to a coaxial mode by the waveguide/coaxial transition circuit 52, and the signal of the coaxial mode is amplified by the low-noise amplifier 52. The amplified signal is mixed with a local frequency signal in the mixer 54 to generate an intermediate frequency signal. The local frequency signal is generated by the local frequency oscillator 57. The intermediate frequency signal is amplified by the intermediate frequency amplifier 55, and the frequency of the amplified intermediate frequency signal is converted by the frequency down converter 59 using an output signal of the frequency synthesizer 60. Then, the frequency-converted signal is demodulated by the demodulator 61, and the demodulated signal is amplified by the amplifier 62. The amplified demodulated signal is applied to the frequency up converter 64. By the frequency up converter 64, the frequency of the amplified demodulated signal is converted to a high frequency millimeter waves by modulating with a local frequency signal of a local frequency for generating millimeter waves. The local frequency signal is generated by the millimeter wave synthesizer 65. The above frequency-converted signal is amplified by the millimeter wave amplifier 66, and then the millimeter wave signal is transmitted from the transmission antenna 23.

FIGS. 5A and 5B indicate a block diagram of a detail of the internal construction of the apparatus for the wireless substation which also functions as an automatic information vending machine, or which starts transmission of the millimeter wave signal when the instruction or the payment is received as explained above. In the construction of FIGS. 5A and 5B, reference numeral 91 denotes an error correction circuit, 92 denotes a descrambler for descrambling a scrambled (ciphered) signal, 93 denotes a control signal discrimination circuit, 94 denotes the CPU, 95 denotes a data storage device, 96 denotes a user operation unit, and 97 denotes a front panel display unit. In FIGS. 5A and 5B, the same reference numerals as FIGS. 4A and 4B respectively denote the same elements.

In the construction of 5A and 5B, the descrambler circuit 92 is provided when the signal transmitted from the communications satellite is scrambled so that the signal cannot be received by receivers other than the apparatus for the wireless substation in the information distribution system. The control signal discrimination circuit 93 is provided for discriminating a predetermined kind of information from other kinds of information transmitted from the communications satellite, by decoding the "INFORMATION CODE" contained in a format of the signal (as explained later), when the wireless substation is used for transmitting a predetermined kind of information only. Instead of providing the control signal discrimination circuit 93, the signal transmitted from the communications satellite may be scrambled differently for each kind of information. In this case, the descrambler circuit 92 should be provided for each kind of information which the wireless substation should transmit by millimeter wave.

The data storage device 95 is provided for storing the information transmitted from the communications satellite, the user operation unit 96 is provided for receiving inputs of customers' instructions, requests, and payment of charges from the front panel, and the front panel display unit 97 is an interface for driving the display unit on the front panel. A message or information to be displayed is shown on the display unit on the front panel. The CPU 94 receives the descrambled information and the discriminated code from the control signal discriminating circuit 93, and stores the information in the data storage unit 95 together with the discriminated code information. As explained later, each item of the information contains information indicating a version of the item. When receiving an item of information through the descrambler circuit 92 and the control signal discriminating circuit 93, the CPU 94 reads the version of the information in the received information before storing the information in the data storage unit 95. Only when the version of the received information is newer than a version of the same information item stored in the data storage unit 95, is the stored information item replaced by the received information. The version of the information item stored in the data storage unit 95 can be stored in an information management table as explained later with reference to FIG. 7. When transmission of one of the information items stored in the data storage unit 98 is requested by the customers' instructions and requests, the CPU 94 supplies the requested information item to the transmission data processing unit 98. In the transmission data processing unit 98, a data frame containing the information item in a predetermined format is generated.

Figure 6B:
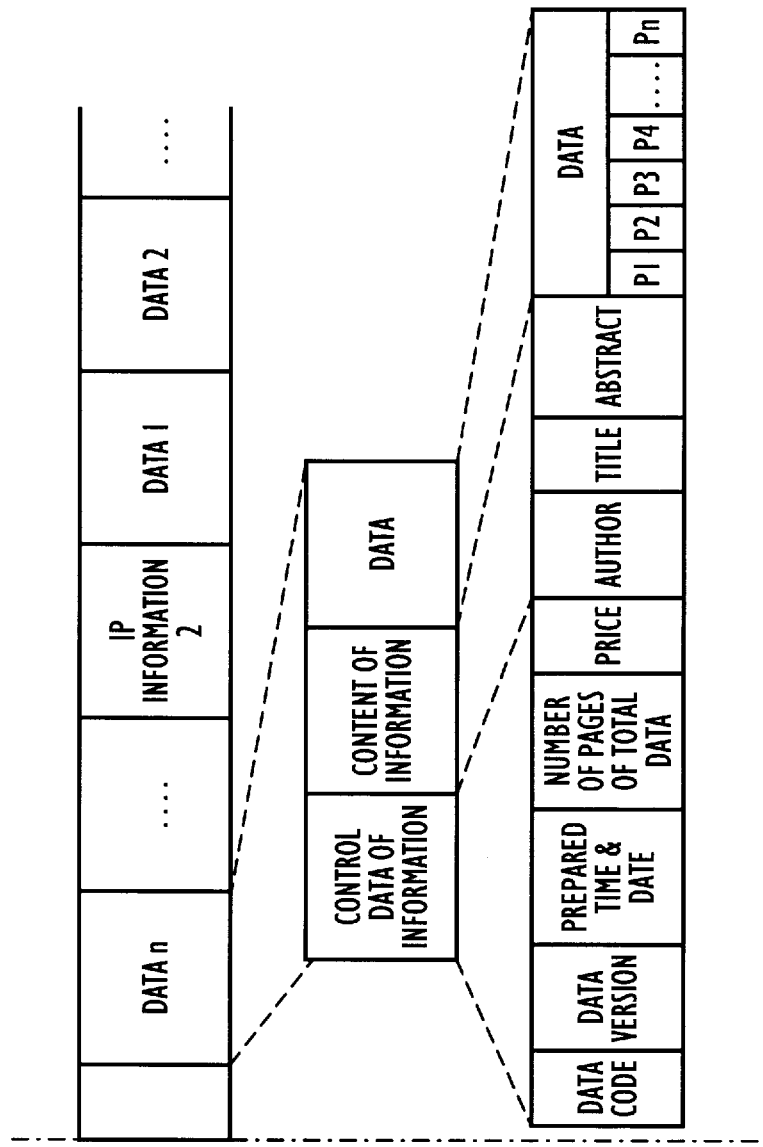

DATA FORMAT OF SIGNAL TRANSMITTED FROM SATELLITE
(FIGS. 6A and 6B)

FIGS. 6A and 6B indicates an example format of data received from a communications satellite. As indicated in the top row of FIGS. 6A and 6B, the data format contains an IP information block, and a plurality of data blocks following the IP information block. As indicated in the middle row of FIGS. 6A and 6B, the IP information block contains a plurality of areas respectively for "INFORMATION CODE", "IP CODE", "IP NAME", "TIME AND DATE OF TRANSMISSION", and "NUMBER (n) OF DATA BLOCKS AND DATA AMOUNT (kilobytes)". The area of "INFORMATION CODE" contains information indicating what kind of information is contained in the following data blocks, for example, general newspaper, sports newspaper, a weekly magazine, or maintenance information for the automatic information vending machine. The area of "IP CODE" contains the name of the information, for example, the name of a newspaper, the name of a magazine, or the like. The area of "IP CODE" contains a code indicating the above name. The area "TIME AND DATE OF TRANSMISSION" contains information on the time and date on which the information was transmitted from the information transmission center, and the area "NUMBER (n) OF DATA BLOCKS AND DATA AMOUNT (kilobytes)" contains information indicating the number of the data blocks following the IP block, and the data amount of the data blocks following the IP block. As indicated in the middle row of FIGS. 6A and 6B, each data block contains areas of "CONTROL DATA OF INFORMATION", "CONTENT OF INFORMATION", and "DATA". The details of these areas are indicated in the bottom row of FIG. 4. The area "CONTROL INFORMATION" contains areas of "DATA CODE", "DATA VERSION", "PREPARED TIME AND DATE", "NUMBER OF PAGES OF TOTAL DATA", and "PRICE". The area "CONTENT INFORMATION" contains areas of "AUTHOR", "HEADLINE", and "ABSTRACT". The area "DATA" contains a plurality of sections "P1", "P2", . . . "Pn", each corresponding to a page. The above area "DATA CODE" contains information comprised of a genre identification code and an article identification code. The genre identification code is predetermined for each genre of articles, and the article identification code is provided for identifying each article. The contents of the other of the above areas will be self-explanatory from their names. The format of FIGS. 6A and 6B may be used for transmitting information from the wireless substation to the terminal equipment.

INFORMATION MANAGEMENT TABLE (FIG. 7)

FIG. 7 indicates an example content of an information management table in the embodiment of the present invention. The apparatus for the wireless substation generates an information management table as indicated in FIG. 7, in an area of a RAM provided in the CPU 93. Using the information management table, a menu search service can be provided for customers. That is, using the information management table, a menu search for a specific IP code (by displaying all items of the specific IP code), a menu search for a specific genre (by displaying all items of the specific genre), a menu search for a specific time and date (by displaying all items of the specific time and date), a menu search for a specific author (by displaying all items of the specific author), and a menu search for a specific combination of any of the above conditions, can be performed. For the above menu search service, it is preferable for the apparatus for the wireless substation to further comprise a display unit, such as a liquid-crystal display device.

FIRST EMBODIMENT OF TERMINAL EQUIPMENT (FIGS. 8, 9A, 9B, 10, 11, and 12)

FIG. 8 illustrates a piece of terminal equipment and a prepaid card to be inserted in the terminal equipment as an embodiment. In FIG. 8, reference numeral 14 denotes a piece of portable terminal equipment, 24 denotes the above-mentioned receiver antenna, 25 denotes a display unit, 26 denotes a cursor, 41 denotes a power switch, 42 denotes a display control switch, 43 denotes an earphone jack, 44 denotes a data output jack, 45 denotes a data output jack for a printer, and 46 denotes a card. The receiver antenna 24 may be provided on a printed circuit board in the terminal equipment. The display unit may comprise a liquid crystal display (LCD) or an electoluminescence (EL) panel of B6 or A5 size. Since the internal circuitry explained with reference to FIG. 4A, 4B, 5A, and 5B may be formed on a large scale integrated circuit (LSI), the terminal equipment can be contained in a small container.

When the power switch 41 is turned ON, power is supplied from an internal battery (not shown) to all portions of the terminal equipment. The display control switch 42 may be a seesaw switch. When an upper side of the seesaw switch is pushed, a displayed scene is scrolled toward an upper direction. When a lower side of the seesaw switch is pushed, the displayed scene is scrolled toward a lower direction. In the case a plurality of items of information being stored in the terminal equipment, selection of one of the plurality of items can be made by displaying an initial menu (as indicated in FIG. 8) when the power is turned ON. The selection is made by operating the upper and lower portions of the seesaw switch to move a cursor position. Another switch may be provided for moving the cursor position.

The earphone jack 43 is provided for outputting a sound signal to drive an earphone. The data output jack 44 is provided for outputting a data signal carrying information stored in the terminal equipment. The data signal output from the terminal equipment may be supplied to a large size display device to display the information. The data output jack 45 is provided for outputting a data signal carrying the information stored in the terminal equipment, to a printer to print out the information.

Although not shown, the terminal equipment can comprise a card handling mechanism for receiving a card 46, and reading information recorded on the card. The card may be a memory card, magnetic card, prepaid card, and the like. The information recorded on the card is, for example, a subscriber's code number, a code indicating a kind or type of information which is allowed for the terminal equipment receiving the card to receive. Further, cipher key information may be recorded on the card when information transmitted from the wireless substation is ciphered. The ciphering operation can be carried out by the CPU 94 in FIGS. 5A and 5B before the CPU 94 supplies the information to be transmitted, to the transmission data processing unit 98.

Figure 9A:
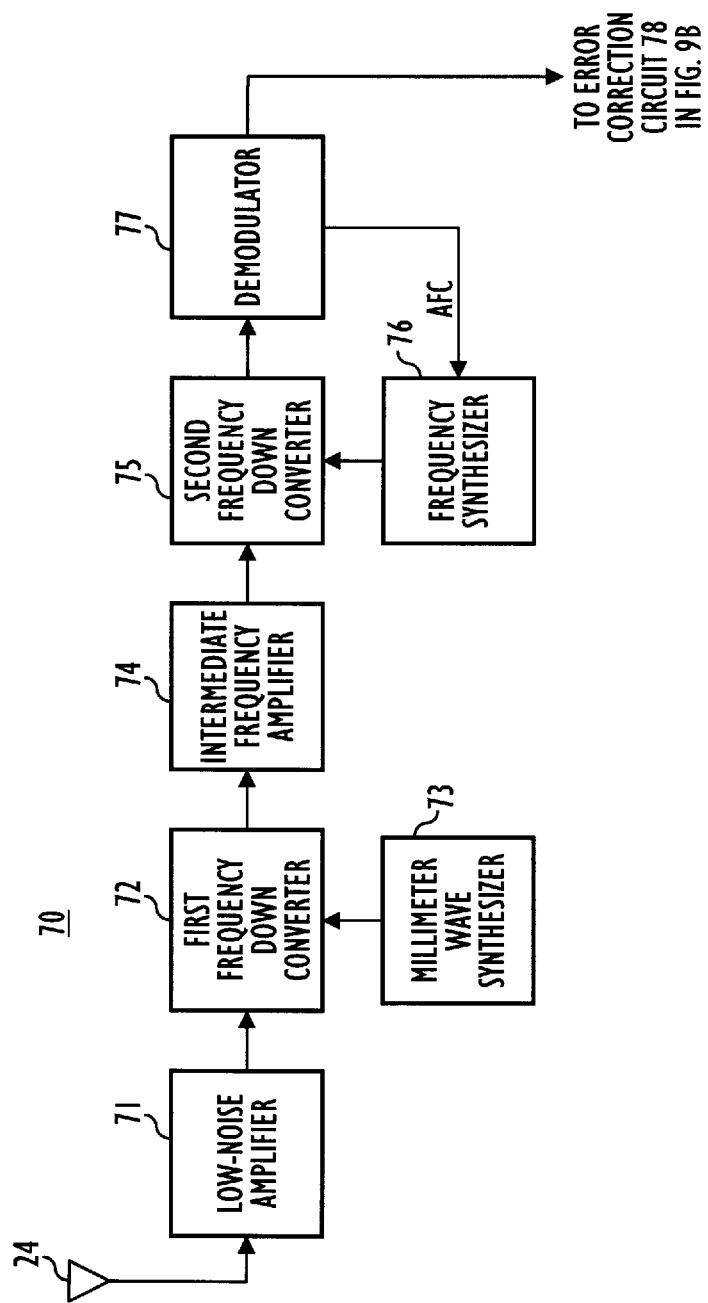
FIGS. 9A and 9B indicate a block diagram of a detail of the internal construction of the terminal equipment of FIG. 8.
Figure 9B:
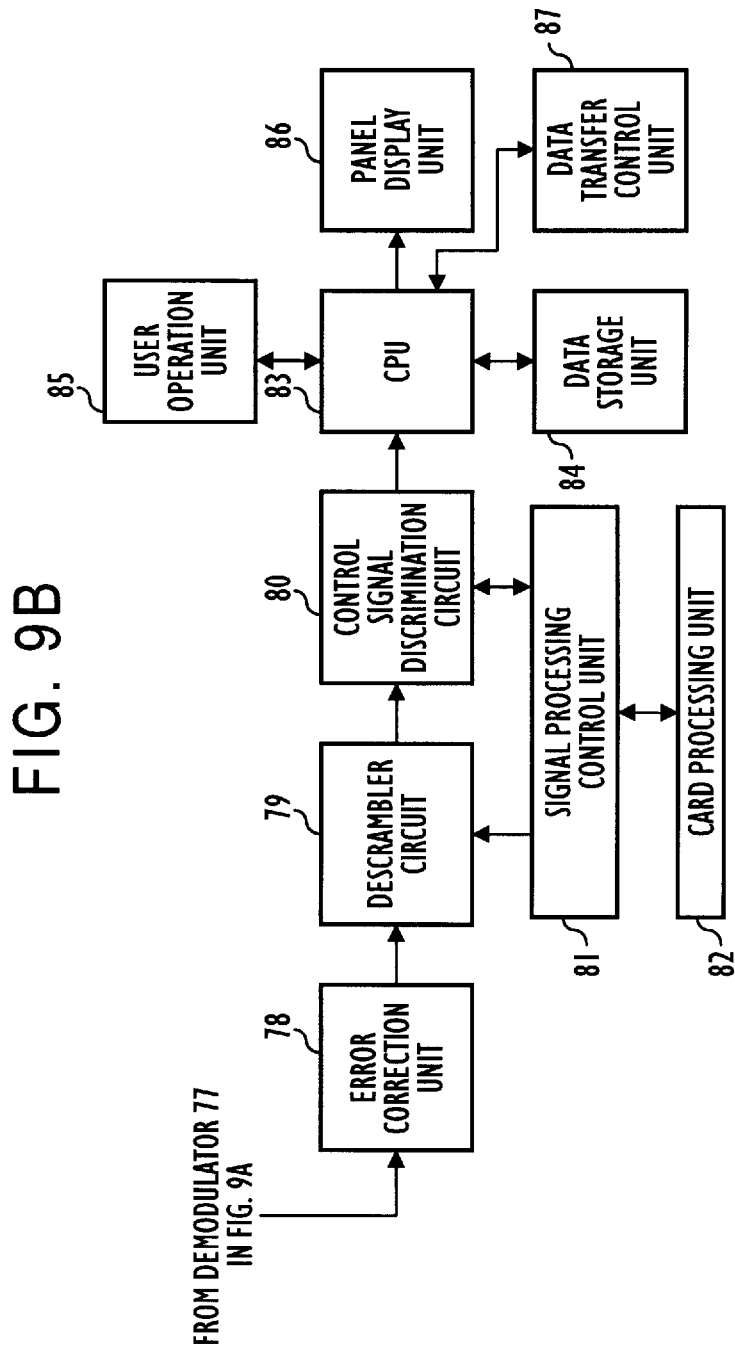

FIGS. 9A and 9B indicate a block diagram of a detail of the internal construction of the terminal equipment of FIG. 8. In FIGS. 9A and 9B, reference numeral 24 denotes the above-mentioned receiver antenna, 70 denotes a receiver portion, 71 denotes a low-noise amplifier, 72 denotes a first frequency down converter, 73 denotes a millimeter wave synthesizer, 74 denotes an intermediate frequency amplifier, 75 denotes a second frequency down converter, 76 denotes a frequency synthesizer, 77 denotes a demodulator, 78 denote an error correction circuit, 79 denotes a descrambler circuit, 80 denotes a control signal discrimination circuit, 81 denotes a signal processing control unit, 82 denotes a card processing unit, 83 denotes the CPU, 84 denotes a data storage device, 85 denotes a user operation unit, 86 denotes a front panel display unit, and 87 denotes a data transfer control unit.

The receiver portion 70 contains the low-noise amplifier 71, the first frequency down converter 72, the millimeter wave synthesizer 73, the intermediate frequency amplifier 74, the second frequency down converter 75, the frequency synthesizer 76, and the demodulator 77.

The millimeter wave transmitted from the wireless substation is received by the receiver antenna 24, and the received signal is amplified by the low-noise amplifier 71. The amplified signal is mixed with a local frequency signal generated by the millimeter wave synthesizer 73, in the first frequency down converter 72 to generate a first intermediate frequency signal. The first intermediate frequency signal is amplified by the intermediate frequency amplifier 74, and the amplified signal is mixed with a second local signal generated by the frequency synthesizer 76, in the second frequency down converter 75 to generate a second intermediate frequency signal. The second intermediate frequency signal is demodulated in the demodulator 77, and the demodulated signal is supplied to the error correction circuit 78 to correct errors included in the demodulated signal. The output of the error correction circuit 78 is supplied to the descrambler circuit 79 to be descrambled. The descrambled signal is supplied to the control signal discrimination circuit 80 to discriminate the code contained in the signal transmitted from the wireless substation and indicating the kind of information carried by the signal. The format as indicated in FIGS. 6A and 6B may be used in the signal transmitted from the wireless substation. As explained below, the descrambler circuit 79 and the control signal discrimination circuit 80 operate under control of the signal processing control unit 81.

Figure 10:
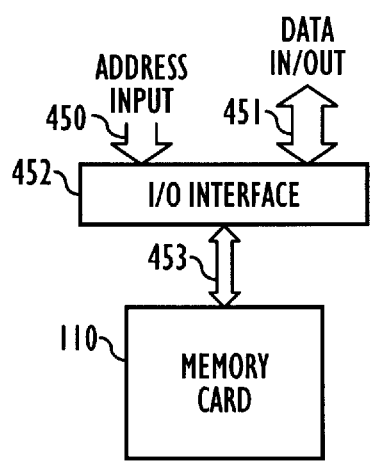
FIG. 10 illustrates the construction for reading data from the card inserted in the terminal equipment.

The card processing unit 82 receives a card inserted into the terminal equipment, and reads the information recorded on a memory card. As mentioned before, the card may be a prepaid card, a magnetic card, or a memory card. FIG. 10 illustrates the construction for reading data from the card inserted in the terminal equipment. In FIG. 10, reference numeral 110 denotes a memory card inserted into the terminal equipment, 450 denotes an address bus, 451 denotes a data bus, 452 denotes an I/O interface, and 453 denotes a connector for connecting address input terminals (not shown) and data input/output terminals (not shown) with the I/O interface 451. The address bus 450 and the data bus 451 are respectively connected to the CPU 83 (FIGS. 9A and 9B). In the construction of FIG. 10, address signals are applied from the CPU 83 to the address input terminals of the memory card 110 through the address bus 450 and the I/O interface 452. When reading data stored in the memory card 110 by the CPU 83, the data is output from the data input/output terminals of the memory card 110 through the I/O interface 452 and the data bus 451 to the CPU 94.

When a prepaid card is inserted, the card processing unit 82 examines the prepaid card to determine a remaining amount of the prepaid card. When it is determined that a predetermined amount remains in the prepaid card, the signal processing control unit 81 allows the above-mentioned operations of the descrambler circuit 79 and the control signal discrimination circuit 80 so that the received information is supplied to the CPU 83 and is stored in the data storage unit 84 under control of the CPU 83. When the information is supplied to the CPU 83 and the data storage unit 84, the remaining amount of the prepaid card is decreased corresponding to an amount of the information supplied to the CPU 83. When it is determined that the remaining amount of the prepaid card is zero, the signal processing control unit 81 stops the operations of the descrambler circuit 79 and the control signal discrimination circuit 80, and the CPU 83 makes the front panel display unit 86 display a message "the remaining amount of the prepaid card is zero".

In the construction of FIGS. 8A and 8B, it is assumed that the signal transmitted from the wireless substation to the terminal equipment is scrambled. Alternatively, the signal may be ciphered. In this case, the descrambler circuit 79 should be replaced with a deciphering circuit, and a key for descrambling the ciphered signal may be recorded on the above card. The card processing unit 82 reads the key from the card to supply the same to the deciphering circuit through the signal processing control circuit 81.

Figure 11:
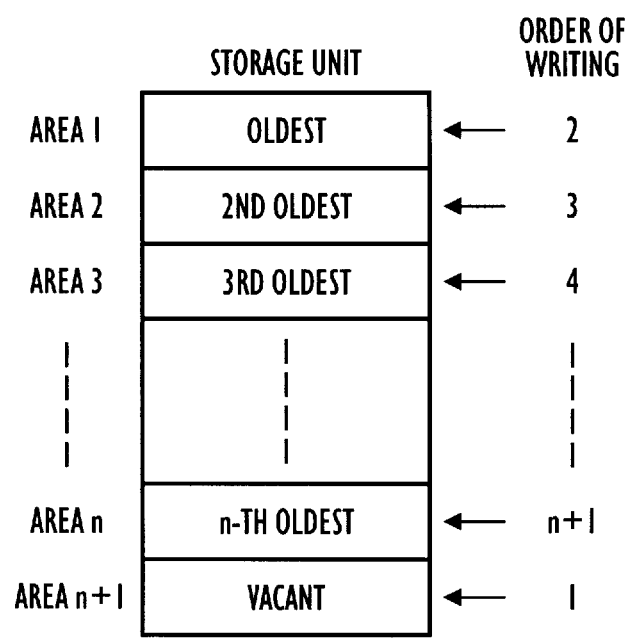
FIG. 11 illustrates a plurality of areas in the information storage memory in the information displaying apparatus in the embodiment of the present invention.

The data storage unit 84 may be a hard disk device of a small size or a random access memory (RAM) having a capacity of several to several hundred megabytes. FIG. 11 illustrates a plurality of areas in the information storage memory in the information displaying apparatus in the embodiment of the present invention. The data storage unit 84 contains a plurality of areas for storing information in respective pages or blocks. When the CPU 83 receives information in a new block or page, the CPU 83 stores the information in one of the plurality of areas in which the oldest information is stored, after the area is cleared. A memory card inserted into the terminal equipment may be used as the data storage unit 84. In this case, when the CPU 83 determines that the memory card is filled up with information, the CPU 83 makes the front panel display unit 86 display a message "there is no vacant area in the memory card. Insert a new memory card."

Figure 12:
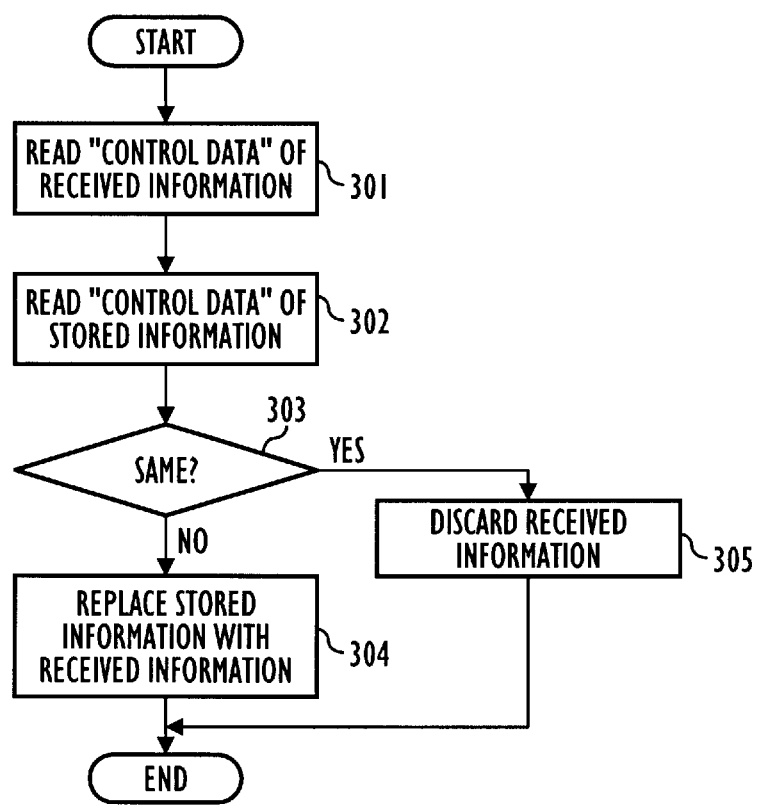
FIG. 12 is a flowchart of an operation of storing received information in the information displaying apparatus in the embodiment of the present invention.

The format as indicated in FIGS. 6A and 6B may be used in the signal transmitted from the wireless substation, and an information management table as indicated in FIG. 7 may be generated by the CPU 83 in the terminal equipment. When the CPU 83 receives a new information item, the CPU 83 reads the version of the information in the received information item before storing the information in the data storage unit 84. Only when the version of the received information is newer than the version of the same information item stored in the data storage unit 84, is the stored information item replaced by the received information. The version of the information item stored in the data storage unit 84 can be stored in the information management table. FIG. 12 is a flowchart of an operation of storing received information in the terminal equipment.

Although not shown, a renewal stop switch may be provided in the terminal equipment of FIG. 8 to stop a renewal operation of the data storage unit 84 (operation of storing a new information block in the d ata storage unit 84).

The data transfer control unit 87 is provided for transferring the information stored in the data storage u nit 84 to another apparatus outs ide of the terminal equipment and connected to the terminal equipment, for example, a large-size display device provided outside of the terminal equipment and connected to the terminal equipment.

SECOND EMBODIMENT OF TERMINAL EQUIPMENT (FIGS. 13, 14, 15A, 15B, and 16)

Figure 13:
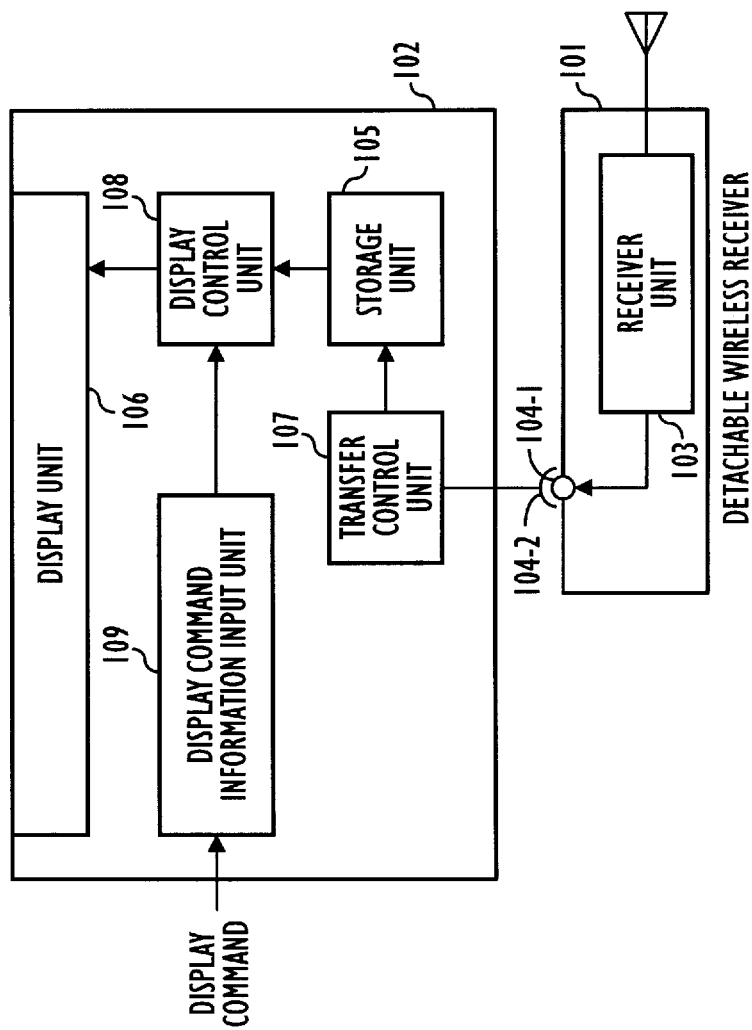
FIG. 13 illustrates a basic construction of an assembly of an information displaying apparatus and a detachable wireless receiver according to the present invention.

FIG. 13 illustrates a basic construction of an assembly of an information displaying apparatus and a detachable wireless receiver according to the present invention. In FIG. 13, reference numeral 101 denotes a detachable wireless receiver, 102 denotes an information displaying apparatus, 103 denotes a receiver unit, 104-1 denotes a signal output terminal, 104-2 denotes a signal input terminal, 105 denotes a storage unit, 106 denotes a display unit, 107 denotes a transfer control unit, 108 denotes a display control unit, and 109 denotes a display command information input unit.

The wireless receiver contains the signal output terminal 104-1 and the wireless receiver unit 103. The signal output terminal, removably coupled to the signal input terminal in the information displaying apparatus 102, outputs a signal carrying information. The wireless receiver unit 103 receives a wireless signal carrying information, and outputs the received inform ation through t he signal output terminal 104-1.

The information displaying apparatus 102 contains the signal input terminal (connector) 104-2, the storage unit 105, the display unit 106, the transfer control unit 107, the display control unit 108, and the display command information input unit 109. The signal input terminal (connector) 104-2 is detachably coupled to the signal output terminal (connector) 104-1 in the detachable wireless receiver 101, and a signal supplied from the detachable wireless receiver 101 and carrying information is input therethrough to the information displaying apparatus 102. The storage unit 105 stores the information carried by the signal. The display unit 106 displays the information stored in the storage unit 105. The transfer control unit 107 receives the signal through the signal input terminal 104-2, and stores the information in the storage unit 105. The display control unit 108 controls the storage unit 105 and the display unit 106 in accordance with a display command. The display command information input unit 109 inputs the display command for commanding the display control unit 108 how the information stored in the storage unit 105 is to be displayed by the display control unit 106.

As indicated in FIG. 13, the wireless receiver 101 is detachable from the information displaying apparatus 102, and the connectors 104-1 and 104-2 are provided in the detachable wireless receiver 101 and the information displaying apparatus 102, respectively, for transferring data received by the wireless receiver 101 to the information displaying apparatus 102.

According to the above detachable construction, various types of wireless receivers other than the wireless receiver for receiving the millimeter wave signal, can be coupled to the information displaying apparatus 102. For example, a receiver for receiving character broadcasting television, a receiver for a pager terminal, and the like can be connected to the information displaying apparatus. Further, various wireless receivers respectively containing different descrambler circuits or deciphering circuits for receiving different kinds of information may be provided in the information distribution system according to the present invention. Since the storage unit 105 is contained in the information displaying apparatus, various types of information which are received by the different types of receivers can be stored in a plurality of areas in the storage unit 105, and can be repeatedly displayed on the display unit 106 at any time.

Figure 14A:
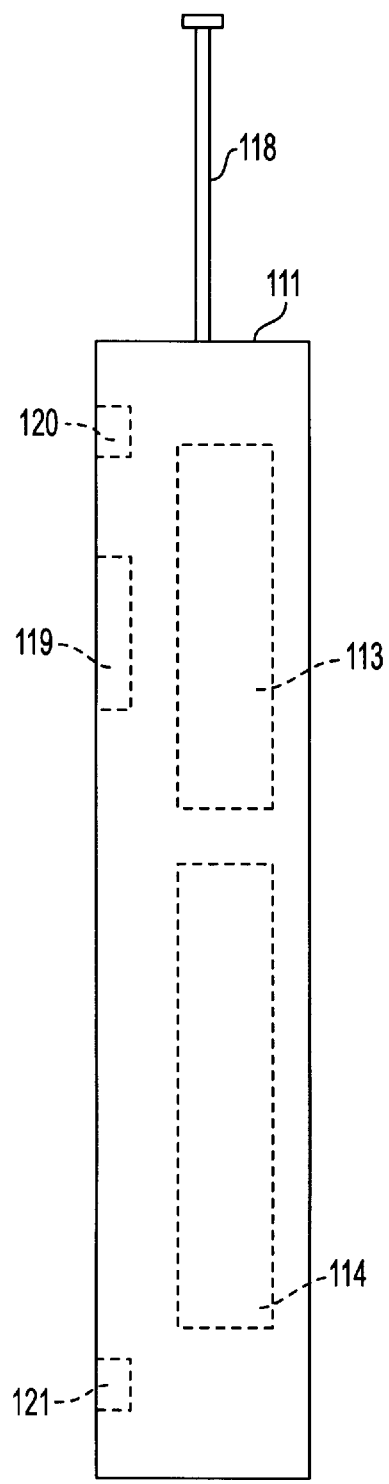
FIGS. 14A and 14B are side views of the information displaying apparatus in an embodiment of the present invention.
Figure 14B:
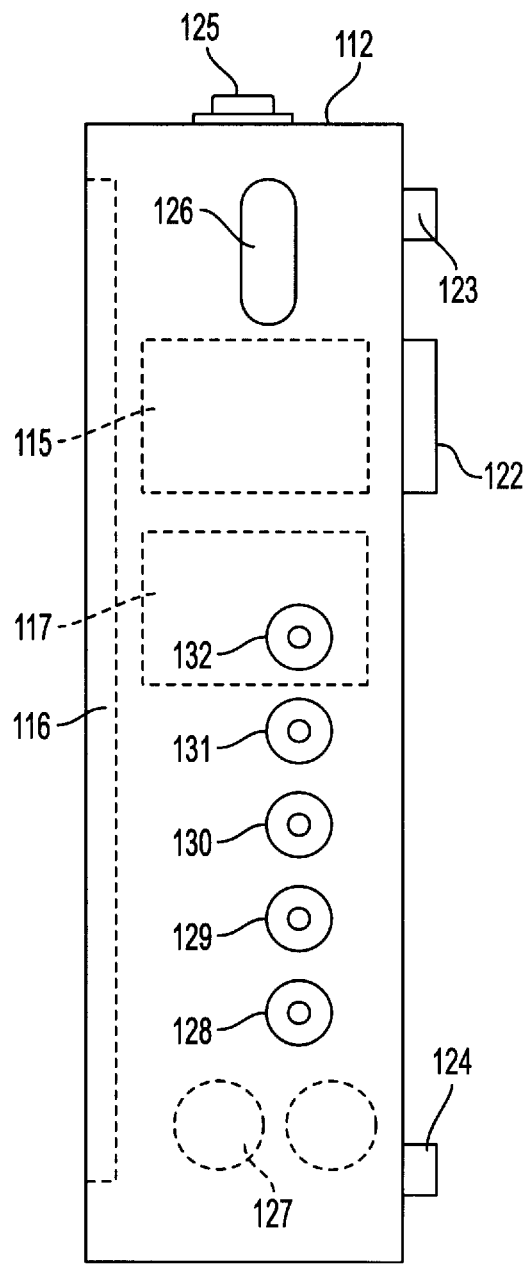

FIGS. 14A and 14B are a side views of the information displaying apparatus in an embodiment of the present invention. In FIG. 14A, reference numeral 111 denotes a container of the wireless receiver. In FIG. 14B, the reference numeral 112 denotes a container of the information displaying apparatus, 113 denotes a wireless receiver unit, 114 denotes a received signal processing unit, 115 denotes a storage unit, 116 denotes a display unit, 117 denotes a control unit, 118 denotes a receiver antenna, 119 denotes a connector in the wireless receiver, 120 and 121 each denote a coupler in the wireless receiver, 122 denotes a connector in the information displaying apparatus, 123 and 124 each denote a coupler in the information displaying apparatus, 125 denotes a power switch, 126 denotes a display control switch, 127 denotes a battery, 128 denotes a power input terminal, 129 denotes an earphone jack, 130 denotes a signal output jack for a printer, 131 denotes a video output jack, and 132 denotes a remote control jack.

The couplers 123 and 124 on the container 112 of the information displaying apparatus, and the couplers 120 and 121 on the container 111 of the wireless receiver can be detachably coupled to each other. When the couplers 120, 121, 123, and 124 are coupled, the connector 119 in the information displaying apparatus and the connector 122 in the wireless receiver are electrically connected. The couplers 120, 121, 123, 124 can be made by a magnet and a magnetic material.

Figure 15B:
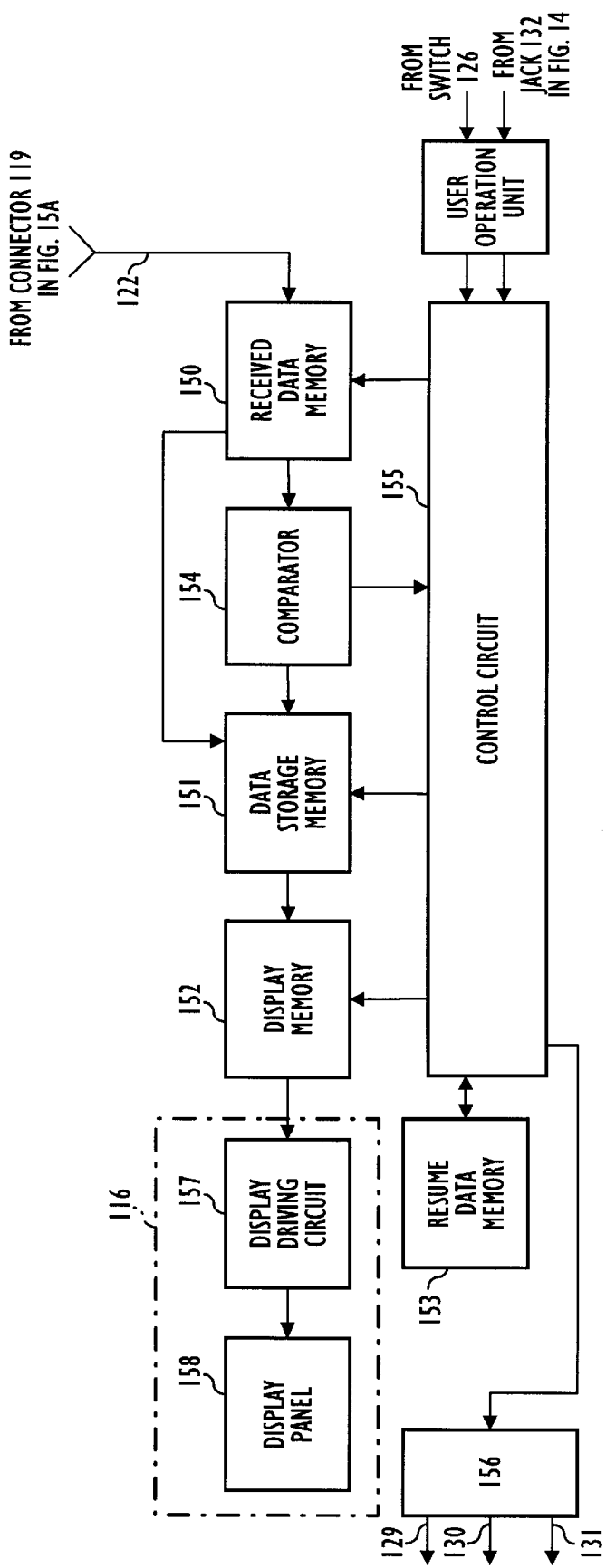
FIG. 15B is a block diagram of a detail of the internal construction of the information displaying apparatus in the embodiment of the present invention.
Figure 16:
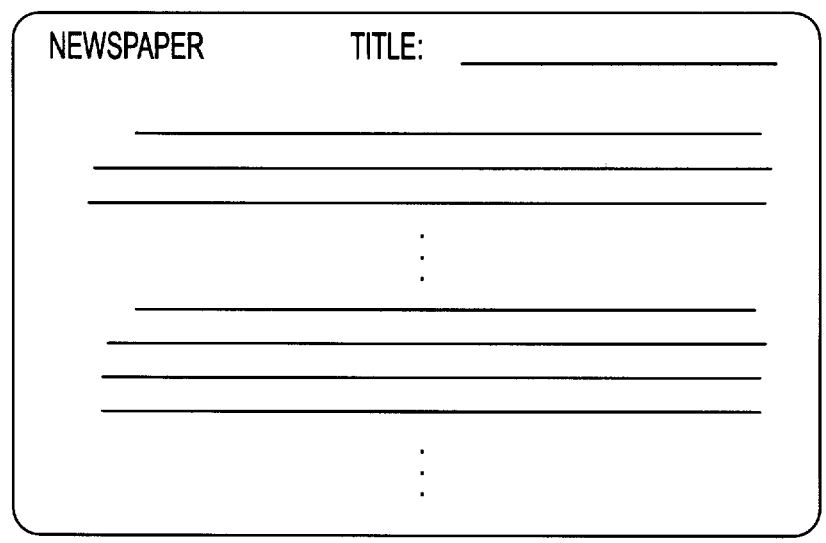
FIG. 16 illustrates an example indication on the display unit in the information displaying apparatus in the embodiment of the present invention.

FIG. 15A is a block diagram of a detail of the internal construction of the detachable wireless receiver in the embodiment of the present invention. As indicated in FIG. 15A, the wireless receiver unit 113 contains a first band-pass filter 141, a millimeter wave amplifier 142, a mixer 143, a local oscillator, a band-pass filter 145, and an intermediate frequency amplifier 146; and the received signal processing unit 114 contains a demodulator 147, a signal processing unit 148, and a deciphering circuit or descrambler circuit 149. In addition, the wireless receiver of FIG. 15A contains a code generator 200. The code generator 200 constantly generates and outputs a code signal indicating a type of the wireless receiver. That is, the code signal indicates the wireless receiver is a receiver for receiving character broadcasting television, a receiver for a pager terminal, or a receiver of a specific kind of information transmitted from a wireless substation in the information distribution system. The code signal is supplied to a control circuit 155 in the information displaying apparatus (explained later with reference to FIG. 15B) through the connectors 119 and 120. When displaying information on the display unit 116 of the information displaying apparatus, the type or kind of information may be displayed with the information. FIG. 16 illustrates an example indication on the display unit in the information displaying apparatus in the embodiment of the present invention.

FIG. 15B is a block diagram of a detail of the internal construction of the information displaying apparatus in the embodiment of the present invention. As indicated in FIG. 15B, the storage unit 115 in the information displaying apparatus contains a received data memory 150, a data storage memory 151, a display memory 152, and a resume data memory 153; the display unit 116 contains a display driving circuit 157 and a display panel 158; the control unit 117 contains a comparator 154, a control circuit 155, and an interface circuit 156. Although not shown in FIG. 15B, the information displaying apparatus contains the user operation unit as indicated by reference numeral 85 in FIG. 9A and 9B for the first embodiment of the terminal equipment. In addition, the information displaying apparatus can contain the construction for receiving and reading information from the card as explained for the first embodiment of the terminal equipment.

When the connectors 119 and 122 are electrically connected, and the power switch is turned ON, electric power is supplied to all the portions of the wireless receiver and the information displaying apparatus. The wireless signal (the millimeter wave signal transmitted from the wireless substation in the information distribution system, a television signal, a paging signal transmitted from a paging station, or the like) is received by the receiver antenna 118, and components in the high frequency band is extracted through the band-pass filter 141. The output of the band-pass filter 141 is amplified by the millimeter wave amplifier 142, and is then mixed with a local frequency signal generated by the local oscillator 144, in the mixer 143. The output of the mixer 143 is supplied to the band-pass filter 145 to extract an intermediate frequency signal, and then the intermediate frequency signal is amplified by the intermediate frequency amplifier 146 to be supplied to the demodulator 147 in the received signal processing unit 114. The intermediate frequency signal is demodulated by the demodulator 147, and then the demodulated signal is processed in the signal processing circuit 148 for correcting an error contained in the demodulated signal. The output of the signal processing circuit 148 is then supplied to the deciphering circuit or descrambler circuit 149 to be deciphered or descrambled. The output of the deciphering circuit or descrambler circuit 149 is output through the connector 119 to the information displaying apparatus. The output of the deciphering circuit or descrambler circuit 149 is input through the connector 122 into the information displaying apparatus, and is temporarily stored in the received data memory 150. When each data block of information is received and stored in the received data memory 150, the content of the area "CONTROL DATA OF INFORMATION" in the newly received block is compared with the content of the area "CONTROL DATA OF INFORMATION" in the information management table stored in the data storage memory 152 by the comparator 154 under control of control circuit 155. When the compared contents are determined to be the same, the data block in the received data memory 150 is cleared. When the compared contents are determined not to be same, the data block in the received data memory 150 is transferred to the data storage memory 151, and the information management table stored in the data storage memory 152 is renewed. The data storing operation may be carried out in the same manner as explained before with reference to FIG. 11. The resume data memory 153 stores resume data such as bookmark information indicating a page number which is to be displayed on the display unit 116.

The user operation unit detects a control input from the display control switch 126 or from the remote control jack 132, and generates a control signal corresponding to the control input to be supplied to the control circuit 155. Receiving the control signal, the control circuit 155 reads the content of the resume data memory 153, transfers the data of the page indicated by the content of the resume data memory 153 and the stored in the data storage memory 151 to the display memory 152, and activates the driver circuit 157 to display the data in the display memory 152 on the display panel 158. The display control switch 126 indicated in FIG. 14 may be a seesaw switch for scrolling the display toward the upper direction or the lower direction. When the control circuit 155 receives a display control signal for requesting to scroll the display toward the upper direction, the control circuit 155 generates address signals to read data on the upper side of the data currently displayed, and writes the data in the display memory 152.

The control circuit 155 can transfer data stored in the data storage memory 151 to another apparatus through the interface circuit 156 and the signal output jack for a printer 130, or the video output jack 132. Further, the interface circuit 156 may comprise an analog to digital converter to convert a digital sound signal to a analog sound signal for driving an earphone connected to the earphone jack 129. Or the information displaying apparatus may comprise a speaker.

We claim:

1. An information distribution system for distributing information, comprising:

a first transmission station for transmitting a first signal carrying information;

at least one second transmission station for receiving the first signal, and broadcasting a second signal carrying the information to an area around the second transmission station, where said second transmission station includes information storing means for storing said information received from said first transmission station, wireless transmitter means for transmitting the second signal by wireless, price payment receiving means for receiving payment of a price predetermined for the information stored by the information storing means, and transmission control means for controlling the wireless transmitter means so that the wireless transmitter means transmits the second signal only when said price payment receiving means receives the payment of the price for the stored information; and at least one piece of terminal equipment for receiving the second signal, and displaying the information carried by the second signal, said second signal being a wireless signal;

said at least one piece of terminal equipment being portable and including, wireless receiver means for receiving said second signal, storage means for storing the information carried by the second signal received by the wireless receiver means, display means for displaying the information stored in the storage means, display control means for controlling the storage means and the display means in accordance with a display command, and display command information input means for inputting the display command for commanding the display control means how the information stored in the storage means is to be displayed by the display control means, said display command information input means having a man-machine interface.

2. An information distribution system according to claim 1, wherein the first signal is transmitted to the second transmission station through a transmission network provided on the ground.

3. An information distribution system according to claim 1, wherein said first signal is a wireless signal, and said information distribution system further comprises a communications satellite for receiving the first signal transmitted by the first transmission station, and transmitting the first signal to the at least one second transmission station.

4. An information distribution system according to claim 1, wherein said information contains a plurality of kinds of information, said at least one piece of portable terminal equipment includes, allowance information inputting means for inputting allowance information which indicates which kind of information is allowed to be stored by the storage means in each terminal equipment when the allowance information is input into the terminal equipment, information discriminating means for discriminating a kind of information indicated by the allowance information from the other kinds of information carried by the second signal when receiving the information by the wireless receiver means, and storing control means for controlling the storage means so that only the kind of information indicated by the allowance information is stored in the storage means; and said allowance information inputting means includes, a card receiving means for receiving a card on which said allowance information is recorded, and a card reading means for reading the allowance information on the card.

5. An information distribution system according to claim 4, wherein said card is a prepaid card.

6. An information distribution system according to claim 1, wherein said information contains a plurality of kinds of information, said wireless receiver means comprises an information discriminating means for receiving only a predetermined kind of information among the information carried by the second signal.

7. An information distribution system according to claim 1, wherein said second signal is transmitted by millimeter wave.

8. An information distribution system according to claim 1, wherein said price payment receiving means includes, a money receiving means for receiving money, a money counting means for counting an amount of the money received by the money receiving means, and a money amount determining means for determining whether or not the amount of the money received by the money receiving means is not less than a predetermined amount to allow transmission of the second signal.

9. An information distribution system according to claim 1, wherein said price payment receiving means comprises, a card receiving means for receiving a card on which said allowance information is recorded, and a card reading means for reading the allowance information on the card.

10. An information distribution system according to claim 1, wherein said wireless transmitter means comprises a scrambling means for scrambling the second signal.

* * * * *